M. DEACON & W. GORE.
APPARATUS FOR MIXING LIQUIDS.
APPLICATION FILED SEPT. 25, 1912.
1,050,111.   Patented Jan. 14, 1913.
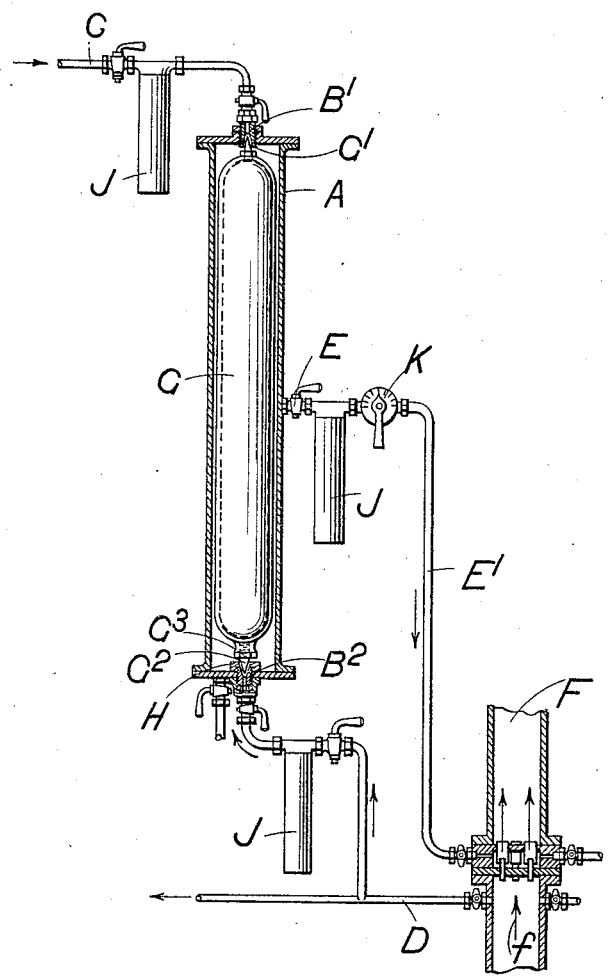

UNITED STATES PATENT OFFICE.

MARTIN DEACON AND WILLIAM GORE, OF LONDON, ENGLAND.

APPARATUS FOR MIXING LIQUIDS.

1,050,111.  Specification of Letters Patent.  Patented Jan. 14, 1913.

Application filed September 25, 1912. Serial No. 722,291.

*To all whom it may concern:*

Be it known that we, MARTIN DEACON and WILLIAM GORE, subjects of the King of England, and residing at London, in England, have invented certain new and useful Improvements in Apparatus for Mixing Liquids, of which the following is a specification.

This invention relates to apparatus for mixing liquids and is intended primarily for use in connection with coagulants or other reagents which are added to water or other liquid as for example in certain filtering operations.

When a liquid reagent is added the volume of the reagent is usually proportional to the amount of the water or other liquid passing through the main and thus it is of importance that the strength or density of the solution containing the reagent should not vary.

According to the present invention the reagent is made up in a solution of greater strength than that required for use and this strong or dense solution is passed through a valve-controlled inlet into a chamber provided with another inlet through which a less dense liquid—preferably water—can enter. The inlets are controlled by a float so arranged that its position, and consequently the relative amount of opening of the inlets, depends upon the density of the mixed liquid in the chamber. An outlet suitably placed allows the mixture to pass away to the main or elsewhere.

The accompanying drawing is an elevation, partly in section, of one construction of apparatus according to this invention.

In this construction the mixing chamber is in the form of a vertical cylinder A having heads or ends at the top and bottom. In the top head is a central inlet B' connected through a pipe C to some reservoir containing the solution of reagent or other dense liquid. A similar inlet B² at the bottom is connected through a pipe D to a supply of water or less dense liquid. Midway in the vessel A is an outlet E through which the mixed liquid of standard density can pass away through a pipe E'. In the drawing the apparatus is shown as being used in connection with a main F through which liquid to be treated is flowing in the direction of the arrow $f$ and the pipe D is connected to the high pressure side of a restriction in the main while the pipe E' is connected to the low pressure side of that restriction.

Within the vessel A is a long cylindrical float G having at each end an axial projection or valve stem. The stem G' at the top end of the float works in conjunction with the inlet B' while the stem G² at the bottom of the float coöperates with the inlet B².

It will be understood that if the weight of the float G is properly adjusted the density of the liquid passing out of the vessel A, by way of the outlet E, can be kept at any predetermined value. If the mixture in the chamber A is too dense the float G will rise and will tend to shut off the supply of dense liquid from the inlet B' and to increase the flow of the water or less dense liquid coming in at the inlet B². If, on the other hand, the solution is too weak the float G will sink opening the inlet B' for the dense liquid and tending to close the inlet B² for the water.

In order that, when the float G sinks, its entire weight shall not be taken by the pointed valve G² it is preferred to employ a construction such as that illustrated in which, when the inlet B² has been closed, the weight of the cylinder G is taken upon a screwed cap H or other rigid shoulder with which the nut or collar G³ on the float G comes into contact. One or other of the inlets B, B² may be adjustable in order to vary the travel of the float.

It is preferred to employ strainers at each of the inlets and at the outlet of the vessel A, for the quantity of liquid required is often very small so that minute orifices are necessary and consequently it is well to avoid any risk of clogging. Such strainers are shown at J and cocks may be provided on each side of each strainer so that any strainer may be removed and cleaned without wasting the liquid.

The cock shown at K is intended to provide a graduated outlet for the mixture passing from the vessel A. The cock may conveniently comprise a plug tap having a series of circular orifices so arranged that any one of them can be brought into line with a straight-through passage. Any well known arrangement of this kind may be employed and obviously it may be inserted at the point where the liquid leaves the main F instead of at the point where it returns to the main.

The float G itself may be made of some material which is not acted upon by the liquid under treatment or may be coated with some such material. Hard rubber or vulcanite may be used for the valves and their seatings.

The apparatus as shown can be used in conjunction with plant such as, for example, is described in the specification of our application for Letters Patent in the United States Serial No. 694267 and in that case it would be placed between the six-way cock described and shown in that specification and the low pressure side of the restriction in the main, the pipe from the six-way cock being connected to the pipe C. The pipe D would then be connected to that inlet of the six-way cock which in the specification referred to is described as being joined to the high pressure side of the restriction.

Although the invention has been described in connection with filtering or like apparatus it will be understood that the mixing chamber and its float may be used wherever it is desired to mix together two liquids differing in density so as to form a solution or mixture of substantially standard strength.

What we claim as our invention and desire to secure by Letters Patent is:—

1. In apparatus for mixing liquids the combination with a mixing chamber having two inlets one for the dense and another for the less dense liquid and an outlet for the mixture of a float contained within the chamber and adapted to open one inlet and close the other as may be necessary to maintain constant the density of the mixture passing through the outlet of the chamber.

2. In apparatus for mixing liquids the combination with a mixing chamber having inlets at the top and bottom thereof of a hollow float carrying valve stems at its extremities such valve stems acting to open or close the inlets according to the position of the float and thus regulate the density of the mixture.

In testimony whereof we have signed our names to this specification in the presence of two subscribing witnesses.

MARTIN DEACON.
WILLIAM GORE.

Witnesses:
FRANCIS EDGAR BURMBY,
HENRY EDWARD THOMPSON ELLIS.

---

Copies of this patent may be obtained for five cents each, by addressing the "Commissioner of Patents, Washington, D. C."